US008727876B2

(12) United States Patent
Maeno

(10) Patent No.: US 8,727,876 B2
(45) Date of Patent: May 20, 2014

(54) METHOD OF IMAGE PROCESSING AND COMPUTER-READABLE RECORDING MEDIUM

(75) Inventor: Tamotsu Maeno, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 275 days.

(21) Appl. No.: 13/498,393

(22) Filed: Mar. 27, 2012

(65) Prior Publication Data

US 2012/0190447 A1    Jul. 26, 2012

Related U.S. Application Data

(63) Continuation of application No. PCT/JP2010/071374, filed on Nov. 30, 2010.

(30) Foreign Application Priority Data

Dec. 10, 2009    (JP) ................... 2009-280915

(51) Int. Cl.
*A63F 13/00*    (2014.01)

(52) U.S. Cl.
USPC .................... 463/31; 463/30; 463/32

(58) Field of Classification Search
USPC ............................... 463/30, 31, 32
See application file for complete search history.

(56) References Cited

U.S. PATENT DOCUMENTS

| | | | | |
|---|---|---|---|---|
| 6,078,329 A | * | 6/2000 | Umeki et al. | 345/419 |
| 7,386,799 B1 | | 6/2008 | Clanton et al. | |
| 2001/0024972 A1 | | 9/2001 | Kitao | |
| 2001/0026284 A1 | | 10/2001 | Yamamoto et al. | |
| 2004/0085356 A1 | | 5/2004 | Kake et al. | |
| 2005/0009602 A1 | | 1/2005 | Nishimura | |
| 2005/0049047 A1 | | 3/2005 | Kitao | |
| 2007/0078706 A1 | | 4/2007 | Datta et al. | |

FOREIGN PATENT DOCUMENTS

| | | |
|---|---|---|
| EP | 1595584 A1 | 11/2005 |
| JP | 11-235466 | 8/1999 |
| JP | 2000-084244 A | 3/2000 |
| JP | 2001-269482 | 10/2001 |
| JP | 2003-058912 | 2/2003 |
| JP | 2004-065839 | 3/2004 |
| JP | 2005-027948 | 2/2005 |
| JP | 2006-277352 | 10/2006 |

OTHER PUBLICATIONS

International Search Report mailed on Feb. 8, 2011.

* cited by examiner

*Primary Examiner* — James S McClellan
(74) *Attorney, Agent, or Firm* — IPUSA, PLLC

(57) ABSTRACT

A computer, functioning as separate units, places at least first, second and viewed objects within a virtual space; displays the objects in a screen by performing a coordinate conversion based on a viewpoint and a viewed point set within the virtual space; moves the first object within the virtual space based on an operation by a player; controls movement of the viewpoint and the viewed point within the virtual space based on an operation by the player; generates an event based on relationship between the first and the second objects which move within the virtual space; determines a center point of the event based on coordinates of the first and the second objects; and sets a target point set on the viewed object as the viewed point, and sets the viewpoint on a half line starting from the viewed point to be passing the center point of the event.

6 Claims, 13 Drawing Sheets

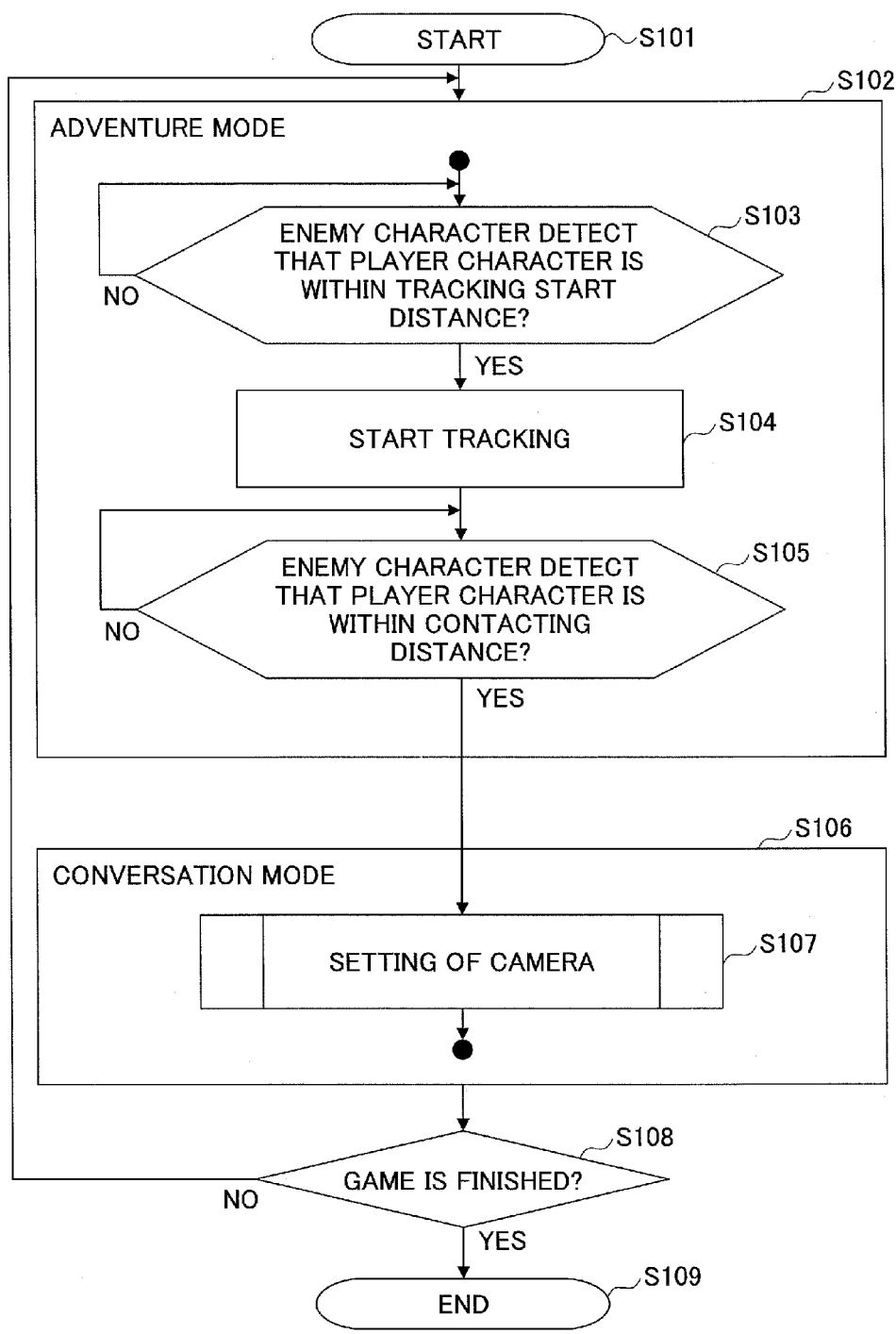

METHOD OF IMAGE PROCESSING AND COMPUTER-READABLE RECORDING MEDIUM

CROSS-REFERENCE TO RELATED APPLICATIONS

This application is a U.S. continuation application filed under 35 USC 111a and 365c of PCT application JP2010/071374, filed Nov. 30, 2010. The entire contents of the foregoing application are hereby incorporated herein by reference.

BACKGROUND OF THE INVENTION

1. Field of the Invention

The present invention relates to a technique to generate a display image in a video game, a Computer Graphics video, or the like.

2. Description of the Related Art

With development of advertisement (hereinafter simply referred to as "AD" as well) business, cases where an AD is inserted into a display image such as a video game, a Computer Graphics (CG) video or the like (for example, Patent Document 1) have been increased. For example, by displaying an image of a predetermined AD board in an image of a scene of streets or the like, the AD is naturally inserted.

PATENT DOCUMENT

[Patent Document 1] Japanese Laid-open Patent Publication No. 2003-58912

When inserting the AD in the display image such as the video game, the CG video or the like, AD rates may be counted in accordance with the number of times the AD is displayed to an audience or the displayed situation of the AD.

Recently, an AD management program module is embedded in the video game or the like as a black box, and a system by which assignment of an AD image and measurement of displaying situation of the AD are automatically performed has been introduced. In this case, the AD management program module automatically assigns a predetermined AD image to a blank advertisement board or the like which is previously set in the game. Then, the AD management program module automatically generates accounting points by determining whether the AD display is effective in accordance with the area rate of the AD display on a display screen such as the AD board or the like and the displayed period for the AD display, and sends accounting point information to a center side via a network. Further, the AD management program module receives updated advertisement images via the network from the center side.

Regardless of whether controlled by the center via the network, it is essential to perform an effective advertisement in order to increase the AD rates. However, it is not good enough to display the AD image with a large amount of area rate with a long period, but it is necessary to naturally display the AD. An excessively forcible display of the AD may cause aversion of audiences so that the AD effect is lowered thereby further reducing the value of the main content such as the video game, the CG video, or the like.

SUMMARY OF THE INVENTION

The present invention is made in light of the above problems, and provides a method of image processing and a computer-readable recording medium capable of naturally and effectively displaying an advertisement.

According to an embodiment, there is provided a non-transitory computer-readable recording medium having recorded thereon an image processing program that causes a computer to function as units including a placing unit that places at least a first object, a second object and a viewed object within a virtual space, as objects within the virtual space; a display unit that displays the objects in a screen by performing a coordinate conversion based on a viewpoint and a viewed point set within the virtual space; a moving unit that moves the first object within the virtual space based on an operation by a player; a moving control unit that controls movement of the viewpoint and the viewed point within the virtual space based on an operation by the player; an event generating unit that generates an event based on a relationship between the second object and the first object which move within the virtual space; a center point determining unit that determines a center point of the event based on a coordinate of at least one of the first object and the second object when the event is generated; and a setting unit that sets a target point set on the viewed object as the viewed point, and sets the viewpoint on a half line starting from the viewed point to be passing the center point of the event.

According to the method of image processing and the computer-readable recording medium, a viewed object such as an advertisement can be naturally and effectively displayed.

BRIEF DESCRIPTION OF THE DRAWINGS

Other objects, features and advantages of the present invention will become more apparent from the following detailed description when read in conjunction with the accompanying drawings.

FIG. 3 is a flowchart showing an example of the method of image processing executed in the image processing apparatus of the embodiment;

DETAILED DESCRIPTION OF THE PREFERRED EMBODIMENTS

The invention will be described herein with Referring to illustrative embodiments. In the following, an example where a video game apparatus is adapted for the image processing apparatus is explained.

Figure 1:
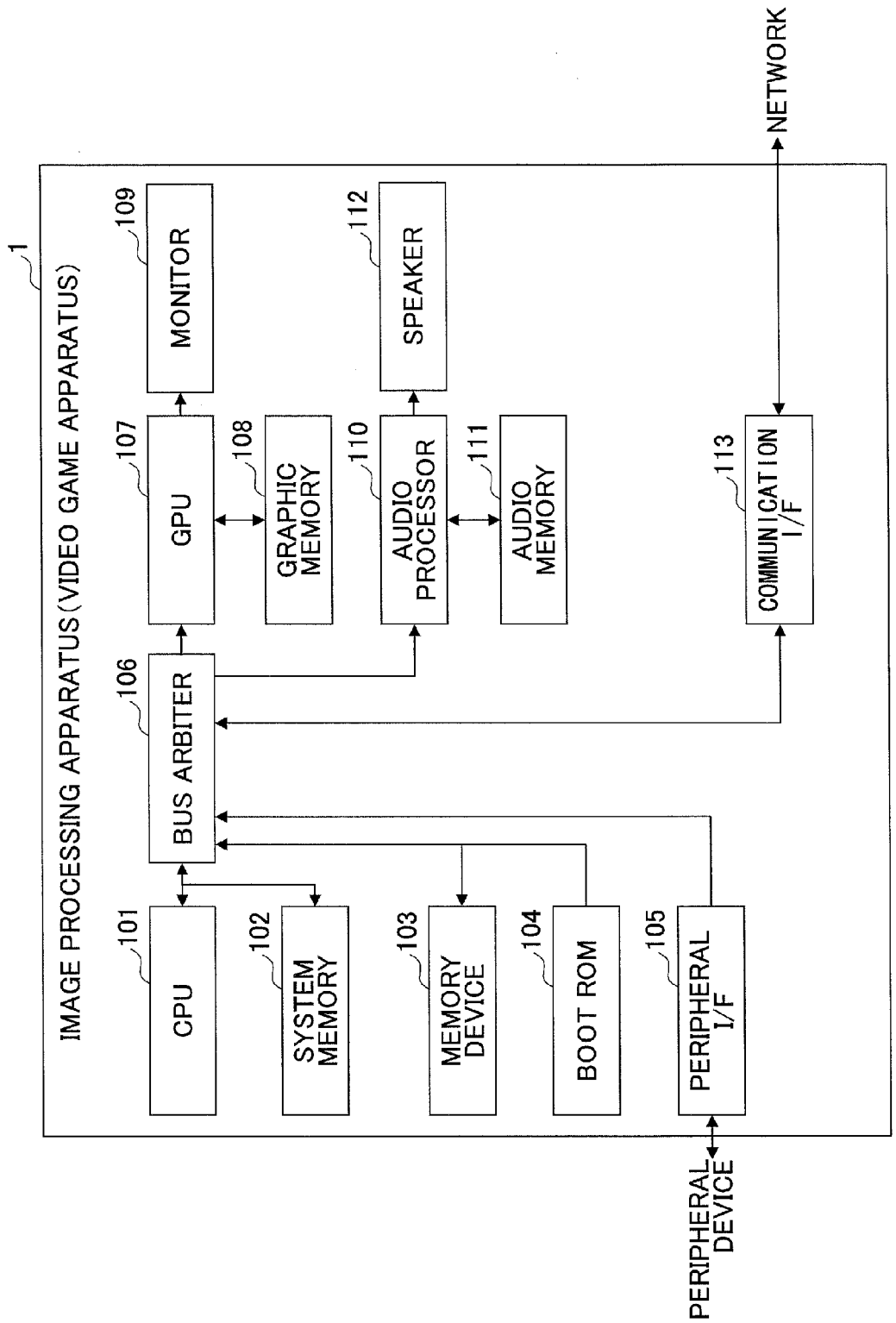
FIG. 1 is a view showing an example of a structure of an image processing apparatus of an embodiment.

FIG. 1 is a view showing an example of a structure of an image processing apparatus 1 of this embodiment.

In FIG. 1, the image processing apparatus 1 such as a video game apparatus or the like includes a Central Processing Unit (CPU) 101 that performs a main control operation, a system memory 102 such as a Random Access Memory (RAM) or the like that stores an executing program and data, a memory device 103 that stores a control program and various data, such as a Read-Only Memory (ROM), a Hard Disk Drive (HDD), a flash memory, a Compact Disk (CD) drive, a Digital Versatile Disk (DVD) drive or the like, a boot ROM 104 that stores a startup program, and a peripheral interface (I/F) 105 that functions as an interface with a peripheral device such as a button, a handle, an accelerator pedal, a brake pedal or the like. The CPU 101, the system memory 102, the memory device 103, the boot ROM 104, and the peripheral interface 105 are connected to a bus arbiter 106 that arbitrates a system bus. The CPU 101 composes a control unit of the image processing apparatus 1 of the embodiment. The peripheral interface 105 composes an input unit of the image processing apparatus 1 of the embodiment.

A Graphics Processing Unit (GPU) 107 that uses a graphic memory 108 for performing a drawing operation of three-dimensional graphics using polygon is connected to the bus arbiter 106. A monitor 109 for display is further connected to the GPU 107. Further, an audio processor 110 that uses an audio memory 111 for outputting voice is connected to the bus arbiter 106. A speaker 112 for outputting voice is further connected to the audio processor 110. Further, a communication interface (I/F) 113 is connected to the bus arbiter 106. The other side of the communication interface 113 is connected to a network to be connected to other video game apparatus or a management server. The monitor 109 composes a display unit of the image processing apparatus 1 of the embodiment. The GPU 107 may compose the control unit of the image processing apparatus 1 of the embodiment.

Figure 2:
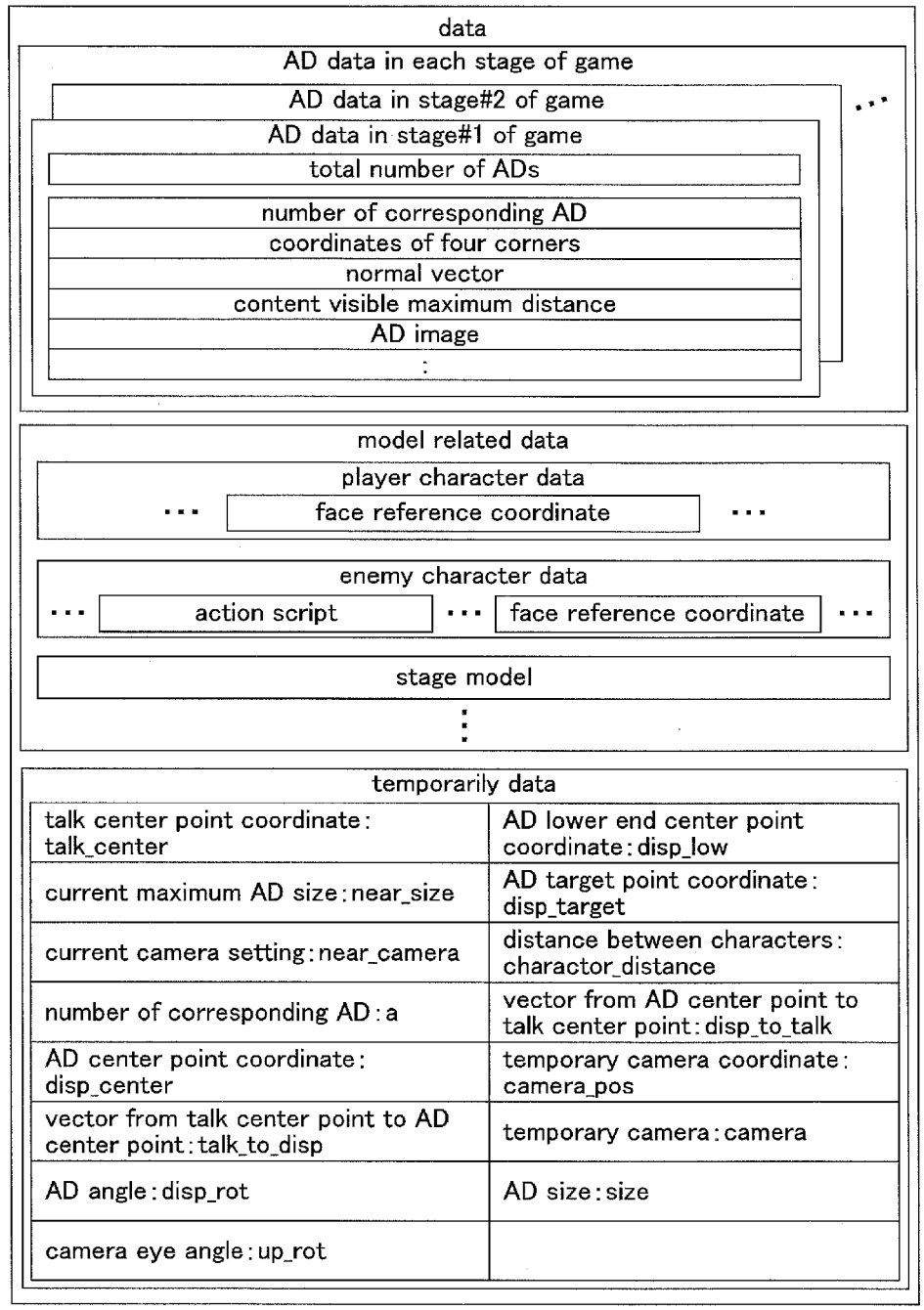
FIG. 2 is a view showing an example of data used in a method of image processing executed in the image processing apparatus of the embodiment.

FIG. 2 is a view showing an example of data used for a method of image processing executed in the image processing apparatus 1. The data includes advertisement data (AD data) in each state of the game, model related data and temporarily data.

The AD data in each stage of the game includes AD data in stage#1 of the game, AD data in stage#2 of the game, and the like, corresponding to each of the stages that transits with a progression of the game. Each of the AD data in stage#1, stage#2 and the like of the game, includes the total number of ADs in the game, the number of the corresponding AD in the game, coordinates of four corners of the corresponding AD, a normal vector of the corresponding AD, a content visible maximum distance of the corresponding AD, an AD image of the corresponding AD, and the like. The coordinates of four corners are three-dimensional coordinates that specify frame of a rectangular AD. The normal vector is a three-dimensional vector that expresses a direction of a surface of the rectangular AD. The content visible maximum distance is the maximum distance (between a virtual camera which becomes a viewpoint and the surface of the AD) by which the content of the AD is visible based on the displaying situation of the AD.

The model related data includes player character data, enemy character data, and stage model for determining permeability of line of vision (just shown as "stage model" in FIG. 2).

The player character data is data of a character the movement of which is mainly controlled by an input operation of a player, and includes a face reference coordinate in addition to a general 3D data and the like. The face reference coordinate is a three-dimensional coordinate corresponding to a position a little bit of the upper portion of a neck of the character, for example.

The enemy character data is data of a character that opposes the player character, and includes action script and a face reference coordinate in addition to a general 3D data and the like. In the action script, a condition for starting an action and contents of the action of the enemy character are described. For example, when it is detected that the player character is within a tracking start distance of an enemy character, then, the enemy character starts tracking the player character. Further, when it is detected that the player character is within a contacting distance of the enemy character, then, the enemy character starts a conversation with the player character.

The stage model for determining permeability of line of vision is model data, in which the frame of a fabric or the like is simplified, for determining whether a line of vision is permeable.

The temporarily data includes, a talk center point coordinate "talk_center", a current maximum AD size in screen "near_size", a current camera setting "near_camera", the number of the corresponding AD in the game "a", an AD center point coordinate "disp_center", vector from the talk center point to the AD center point "talk_to_disp", an AD angle "disp_rot", a camera eye angle "up_rot", an AD lower end center point coordinate "disp_low", an AD target point coordinate "disp_target", a distance between characters "charactor_distance", vector from the AD center point to the talk center point "disp_to_talk", a temporary camera coordinate "camera_pos", a temporary camera "camera", and an AD size "size" in screen. Each meaning will be explained later.

FIG. 3 is a flowchart showing an operation of the embodiment.

As the process of the game is mainly shown in FIG. 3, generation of a display image is not specifically described. For generation of the display image, under a control by the CPU 101 (FIG. 1), model data of an object to be displayed is placed within a virtual three-dimensional space in accordance with game logic, and an image of each of the objects is generated to a two-dimensional image seen from a viewpoint (virtual camera) by processing of a vertex shader and a pixel shader executed by the GPU 107. The viewpoint and a viewed point may be controlled to move in accordance with the movement of the object which is moved by an input operation of the player to include the image of the object in the display screen, or may be moved in accordance with an input operation (operation of an arrow key, an LR button or the like) of the player.

The processing by the vertex shader includes conversion of an apex of polygons to the view space and the projection space, rasterization or the like. The processing by the pixel shader includes texturing onto a surface of the polygon or the like.

Figure 4A:
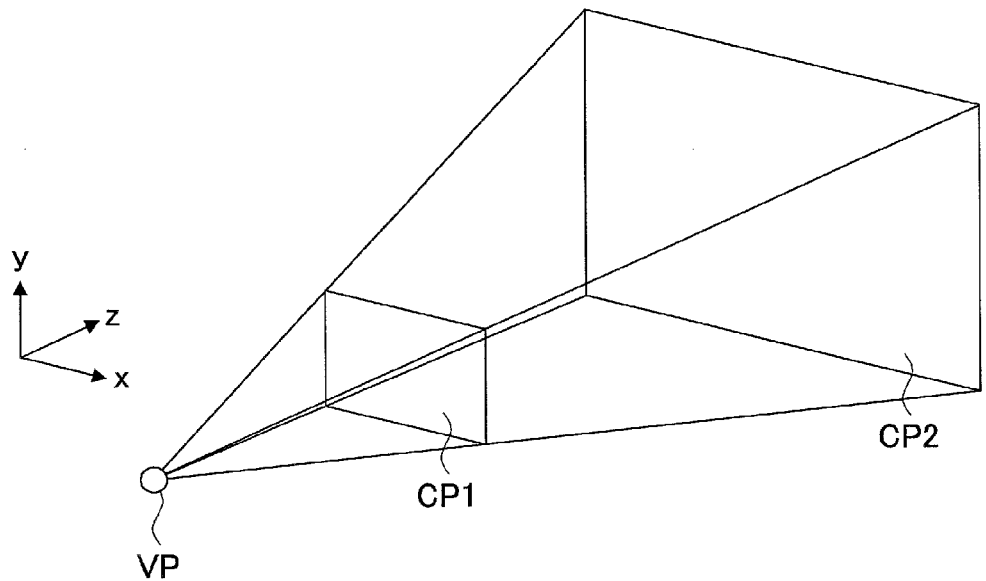
FIG. 4A is a view showing an example of a view space.
Figure 4B:
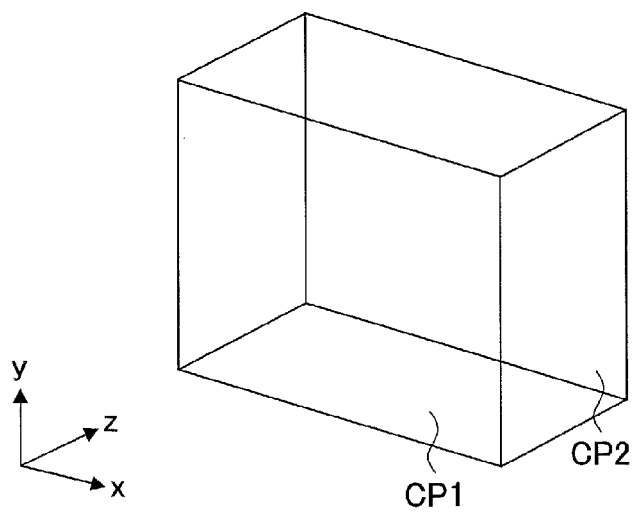
FIG. 4B is a view showing an example of a projection space.

FIG. 4A is a view showing an example of a view space. The view space is a coordinate space where the viewpoint "VP" is an origin, and a lateral axis is an x-axis, a vertical axis is a y-axis, and depth direction is a z-axis when viewed in the visual direction from the viewpoint "VP". A near clip plane CP1 and a far clip plane CP2 are set at the near side and the far side from the viewpoint "VP", respectively, within a range of an angle of view in the x-axis direction and in the y-axis direction in the visual direction of the viewpoint "VP". A model (object) placed inside a hexahedron enclosed by the near clip plane CP1, the far clip plane CP2 and the surfaces of the angle of view becomes a target to be drawn. The position of the hexahedron is determined to include an image of a player character which is controlled by an input operation of an input unit by the player, for the video game. FIG. 4B is a view showing an example of a projection space, which is obtained by converting the view space shown in FIG. 4A within a range of $-1<=x<=1, -1<=y<=1, 0<=z<=1$.

Referring back to FIG. 3, when the operation is started (step S101), in accordance with an input operation by the player, an operation of an adventure mode in which the player character moves in a three-dimensional virtual space is performed (step S102).

Figure 5:
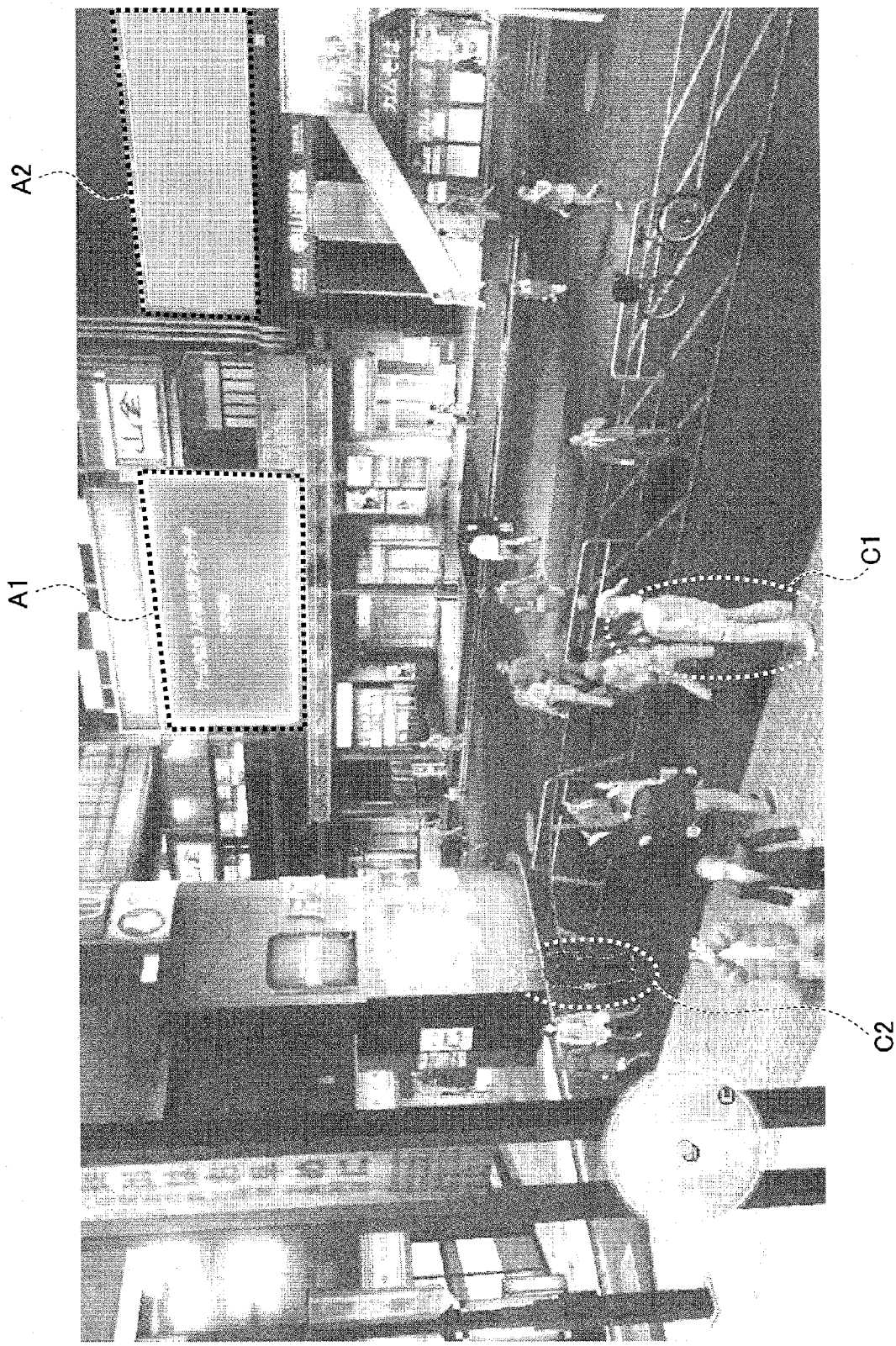
FIG. 5 is a view showing an example of a display screen displayed in an adventure mode operation.

In the operation of the adventure mode (step S102), when any of the enemy characters detects that the player character is within its tracking start distance (YES of step S103), the enemy character starts tracking the player character (step S104). FIG. 5 is a view showing an example of a display screen which is displayed at the time when the tracking is started because the player character C1 is within the tracking start distance of the enemy character C2 in the adventure mode. The numerals "A1" and "A2" are ADs (AD boards).

Figure 6:
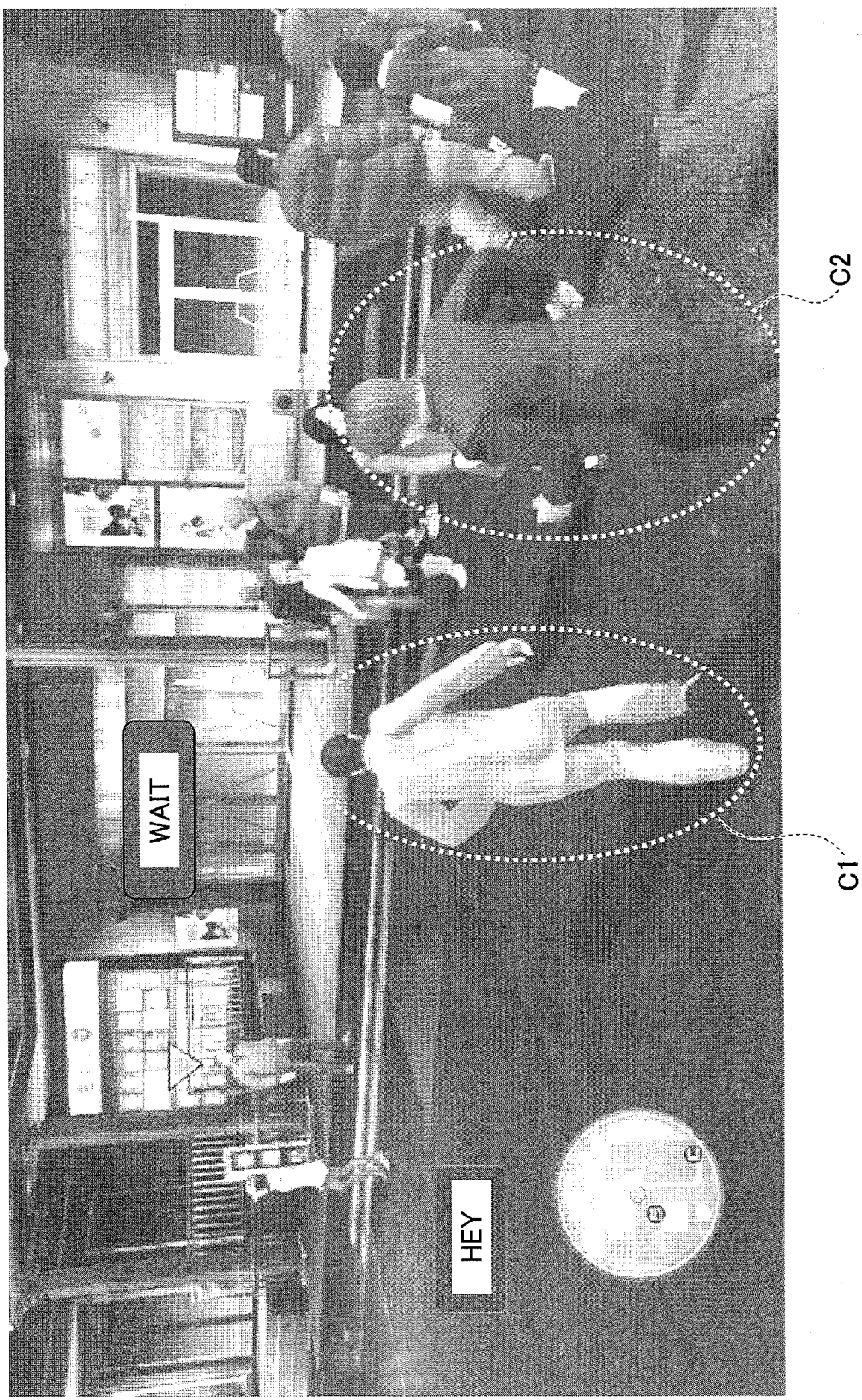
FIG. 6 is a view showing an example of a display screen displayed in a conversation mode operation.

Referring back to FIG. 3, further, when the enemy character detects that the player character is within its contacting distance (YES of step S105), the operation is transferred to a conversation mode (step S106). FIG. 6 is a view showing an example of a display screen which is displayed at the time when a conversation is started because the player character C1 is caught up by the enemy character C2 to be within the contacting distance of the enemy character C2 in the adventure mode.

Referring back to FIG. 3, when the operation proceeds to the conversation mode (step S106), first, setting of a camera is performed (step S107), and then a normal operation of the conversation mode is performed. The setting of a camera, in which the most effective AD in displaying is selected among plural ADs capable of being displayed for the scene, and the most effecting setting of a camera (a viewpoint and a viewed point) is determined, will be explained later in detail. The control of movement of the viewpoint and the viewed point set in the setting of a camera is terminated for a certain period or a predetermined period until an input operation by the player is detected, to promote the eyes of the player on the AD image.

Then, after the conversation mode, whether the game is finished is determined (step S108), and when it is not finished (NO of step S108), the process goes back to the operation of the adventure mode (step S102), while when it is finished (YES of step S108), the process is finished (step S109).

Figure 7:
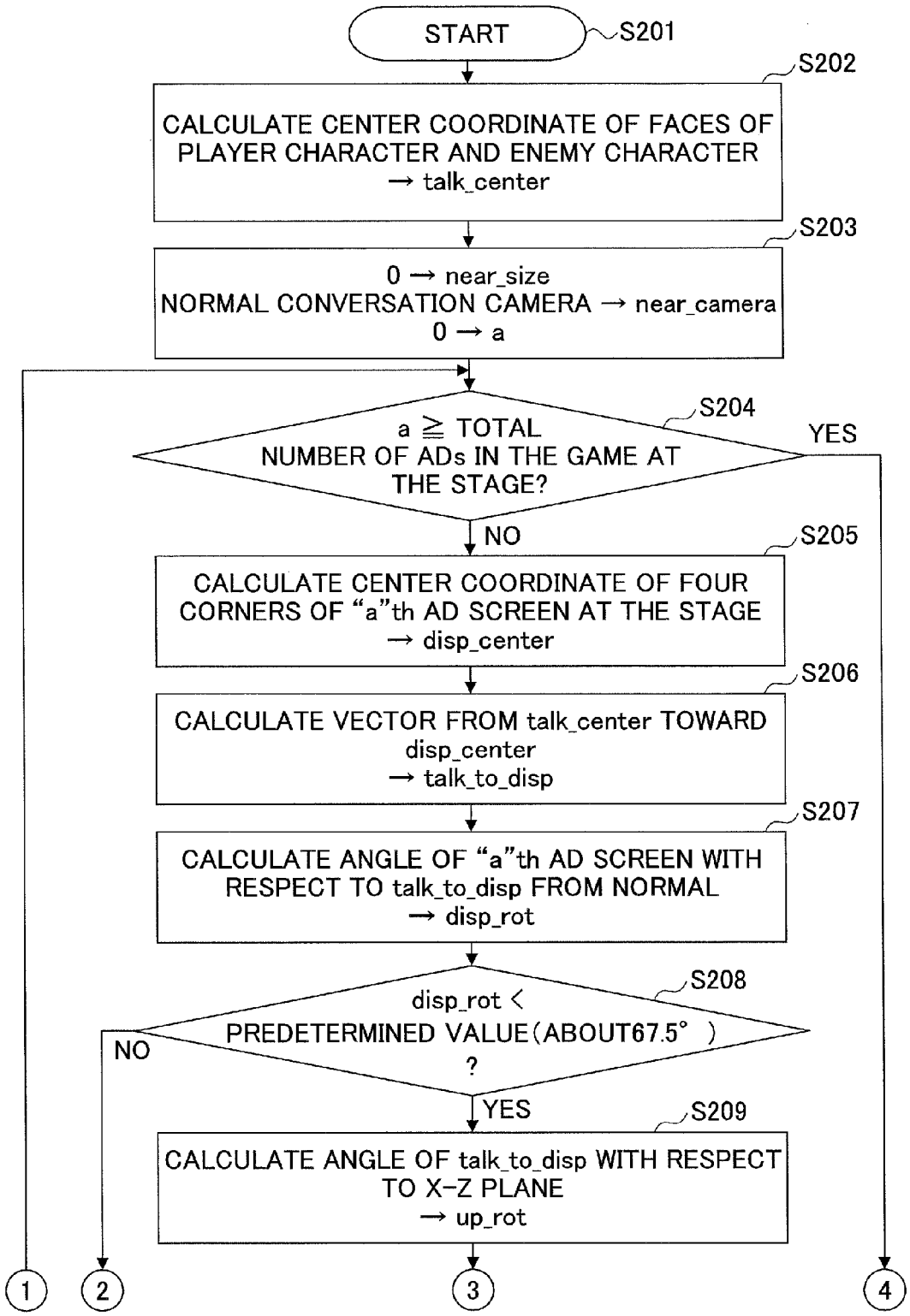
FIG. 7 is a flowchart for explaining an example of setting of a camera.
Figure 8:
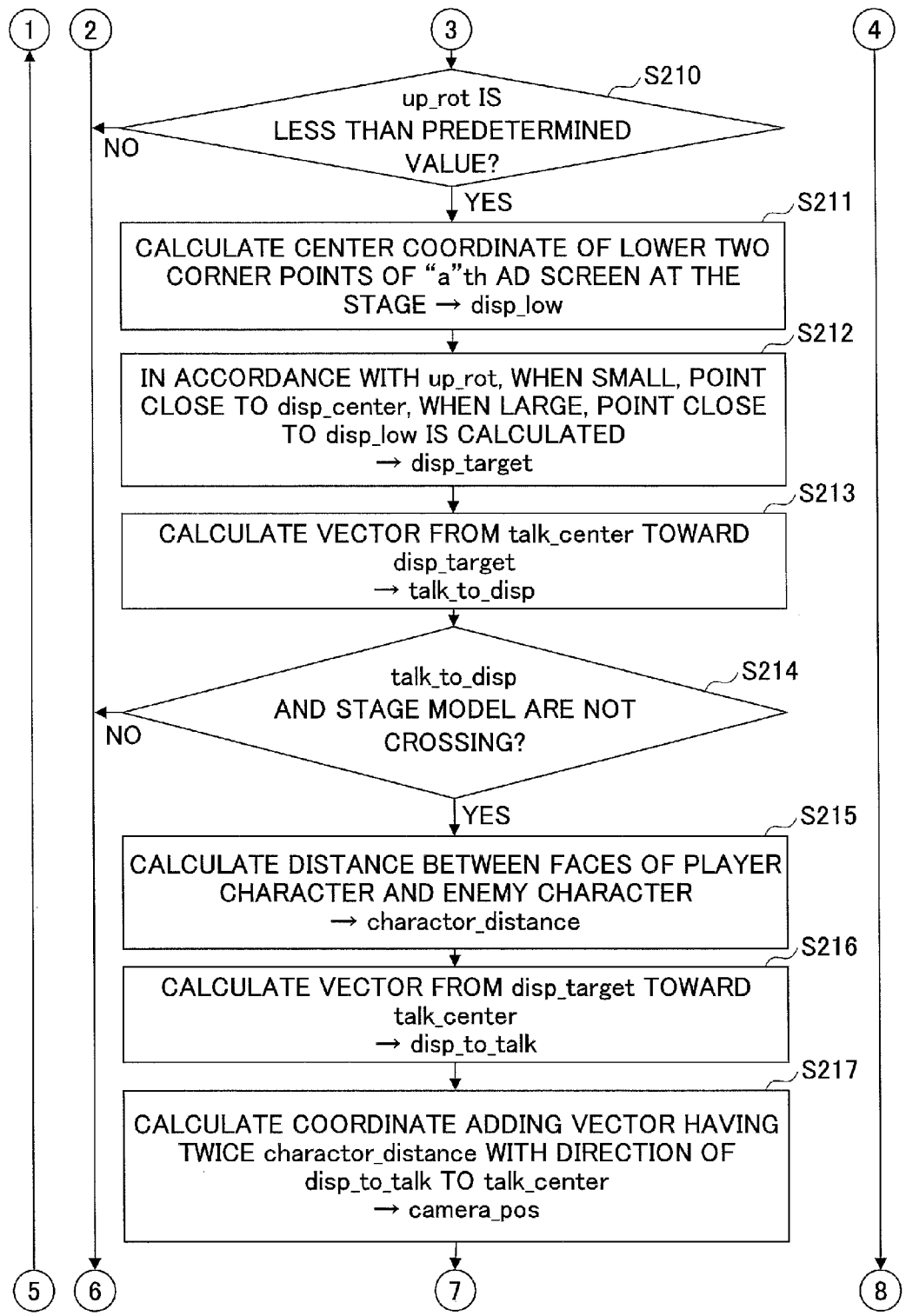
FIG. 8 is a flowchart for explaining an example of setting of a camera.
Figure 9:
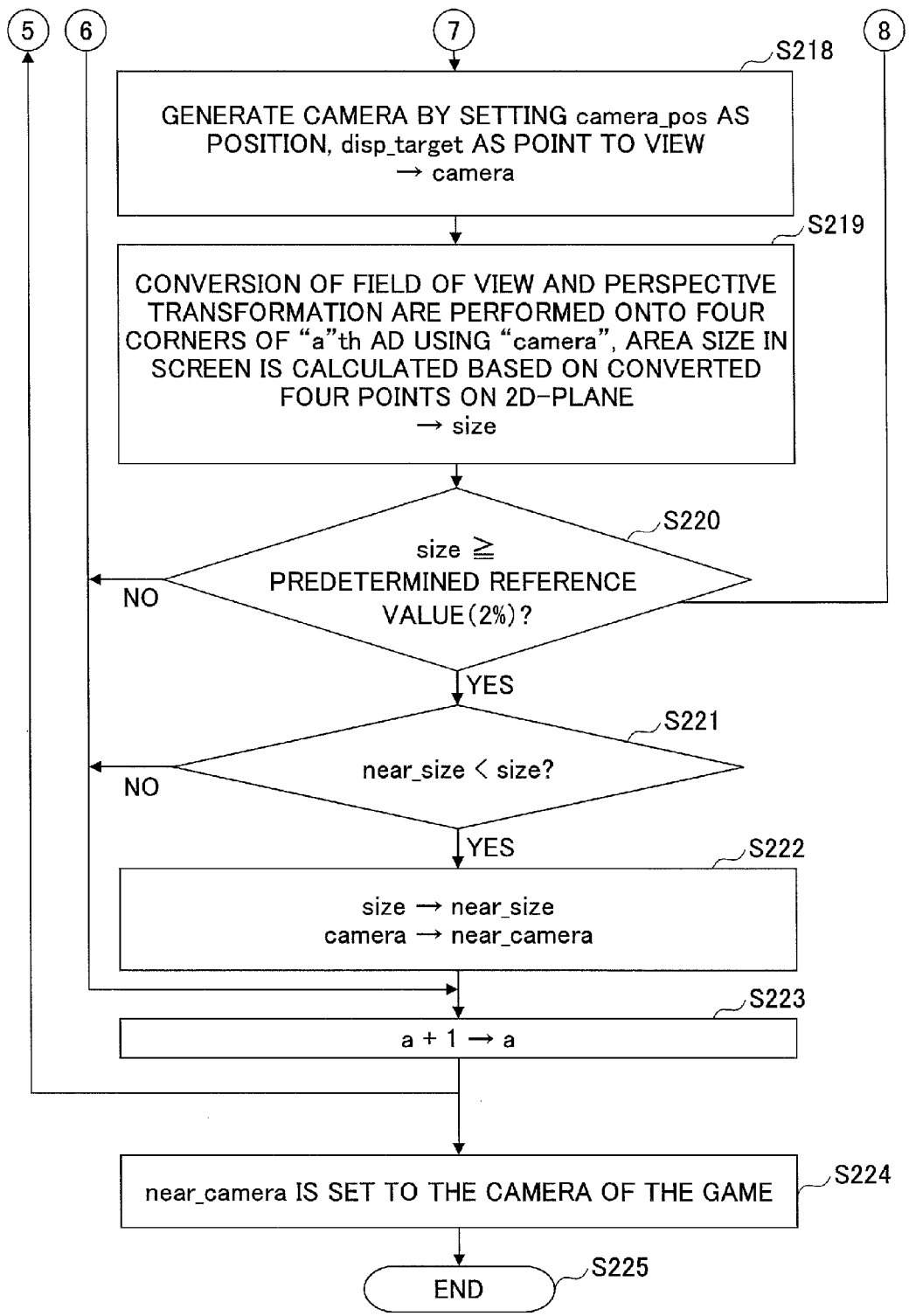
FIG. 9 is a flowchart for explaining an example of setting of a camera.

FIG. 7 to FIG. 9 are flowcharts showing an example of the setting of a camera (step S107 in FIG. 3). In the following, it is assumed that the setting of a camera is executed by the CPU 101 shown in FIG. 1, but this operation may also be executed by the GPU 107.

Figure 10:
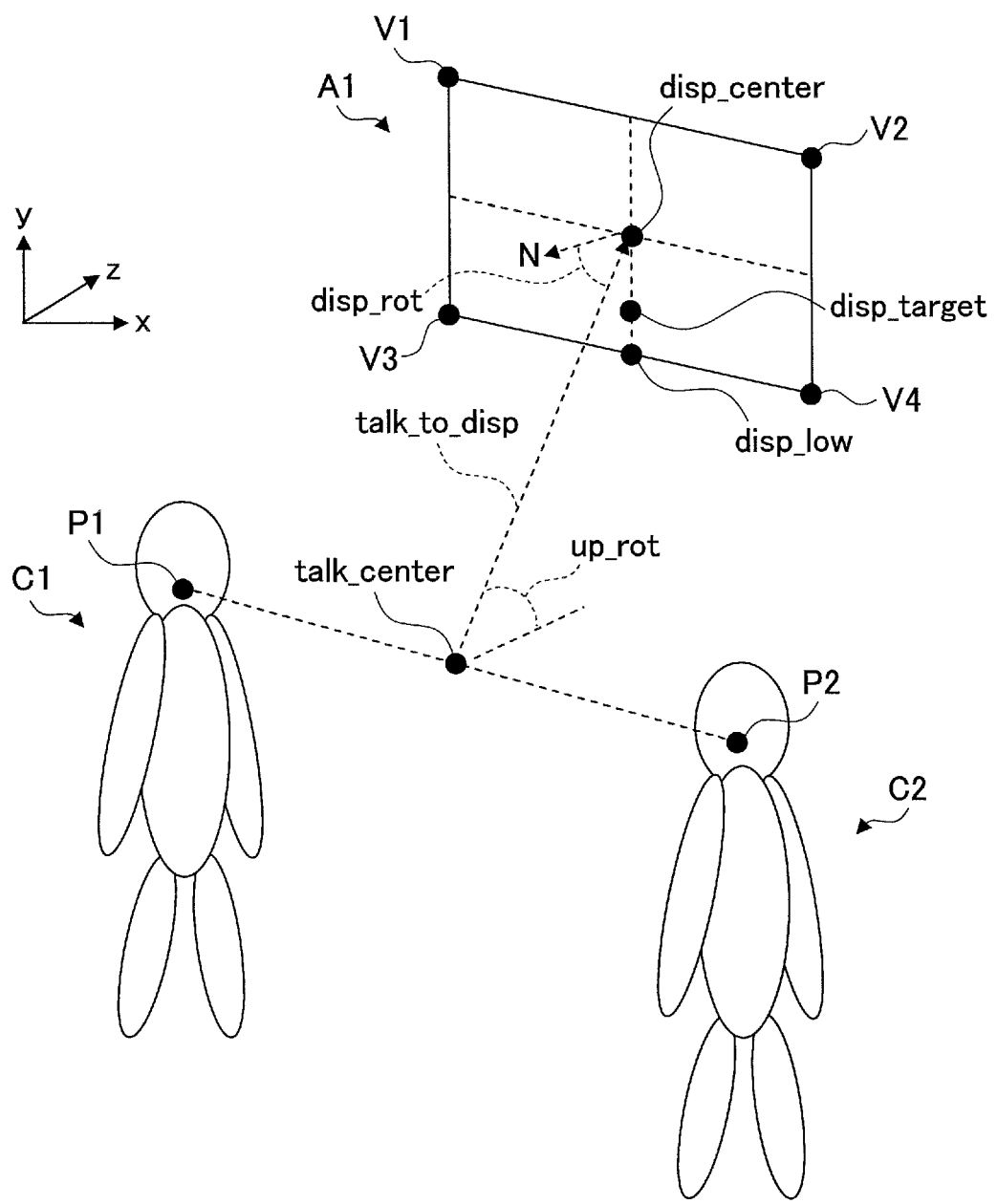
FIG. 10 is a view for explaining targets to be calculated by the setting of a camera.

Referring to FIG. 7, when the setting of a camera is started (step S201), a center coordinate of the face of the player character and the face of the enemy character is calculated to be set as the talk center point coordinate "talk_center" (step S202). FIG. 10 is a view schematically showing positions of the player character C1 and the enemy character C2, and a center coordinate of a line segment between the face reference coordinate P1 of the player character C1 and the face reference coordinate P2 of the enemy character C2 becomes the talk center point coordinate "talk_center".

Referring back to FIG. 7, "0" is set to the current maximum AD size in screen "near_size", "normal conversation camera" is set to the current camera setting "near_camera", and "0" is set to the number of the AD in the game "a" (step S203).

Subsequently, whether the number of the AD in the game "a" is more than or equal to the total number of ADs in the game at the current stage is determined (step S204). When the number of the AD in the game "a" is more than or equal to the total number of ADs in the game at the current stage (YES of step S204), the current camera setting "near_camera" is set to the camera of the game (step S224 in FIG. 9). Then, the operation is finished (step S225 in FIG. 9).

When the number of the AD in the game "a" is less than the total number of ADs in the game at the current stage (NO of step S204), a center coordinate of four corners of the "a"th AD screen at the current stage is calculated to be set as the AD center point coordinate "disp_center" (step S205). Referring to FIG. 10, the center coordinate of the AD "A1" enclosed by the corner points V1 to V4 is shown as the AD center point coordinate "disp_center" at the upper part of FIG. 10.

Referring back to FIG. 7, the vector from the talk center point coordinate "talk_center" toward the AD center point coordinate "disp_center" is calculated to be set as the vector from the talk center point toward the AD center point "talk_to_disp" (step S206). With reference to FIG. 10, the vector from the talk center point toward the AD center point "talk_to_disp" which is from the talk center point coordinate "talk_center" toward the AD center point coordinate "disp_center" is shown.

Referring back to FIG. 7, the angle of the "a"th AD screen with respect to the vector from the talk center point toward the AD center point "talk_to_disp" is calculated from normal of the "a"th AD screen and set as the AD angle "disp_rot" (step S207). Referring to FIG. 10, the AD angle "disp_rot" defined by an angle between the vector from the talk center point toward the AD center point "talk_to_disp" and the normal "N" of the AD "A1" is shown.

Referring back to FIG. 7, whether the AD angle "disp_rot" is less than a predetermined value (for example, 67.5°) is determined (step S208). When the AD angle "disp_rot" is not less than the predetermined value (larger than or equal to the predetermined value) (NO of step S208), it is determined that the AD is not visible because of the angle, and the number of the AD in the game "a" is incremented (step S223 in FIG. 9). Then, the process goes back to the comparison with the total number of AD in the game at the current stage (step S204).

When the AD angle "disp_rot" is less than the predetermined value (YES of step S208), an angle of the vector from the talk center point toward the AD center point "talk_to_disp" with respect to an x-z plane is calculated to be set as the camera eye angle "up_rot" (step S209). Referring to FIG. 10, the camera eye angle "up_rot" which is an angle of the vector from the talk_center point toward the AD center point "talk_to_disp" with respect to the x-z plane is shown.

Then, Referring to FIG. 8, whether the camera eye angle "up_rot" is less than a predetermined value is determined (step S210). When the camera eye angle "up_rot" is not less than the predetermined value (larger than or equal to the predetermined value) (NO of step S210), it is determined that it is unnatural because the AD faces too upward to see the AD and the number of the AD in the game "a" is incremented (step S223 in FIG. 9) and the process goes back to the comparison with the total number of AD in the game at the current stage (step S204).

When the camera eye angle "up_rot" is less than the predetermined value (YES of step S210), a center coordinate of the lower two corner points of the "a"th AD screen of the current stage is calculated to be set as the AD lower end center point coordinate "disp_low" (step S211). Referring to FIG. 10, the AD lower end center point coordinate "disp_low" as the center coordinate of the lower corner points V3 and V4 of the AD "A1" is shown.

Referring back to FIG. 8, in accordance with the camera eye angle "up_rot", when the angle is small, a point close to the AD center point coordinate "disp_center", and when the angle is large, a point close to the AD lower end center point coordinate "disp_low", is calculated to be set as the AD target point coordinate "disp_target" (step S212). In other words, when the line of vision of the camera is directed upward it becomes unnatural so that a correction to decrease the angle of the line of vision of the camera is performed. Referring to FIG. 10, the AD target point coordinate "disp_target" set between the AD center point coordinate "disp_center" and the AD lower end center point coordinate "disp_low" is shown. For an environment where the AD is displayed below the eye line, the opposite direction to the above operation, the correction is performed between the AD center point coordinate and an AD upper end center coordinate.

Figure 11:
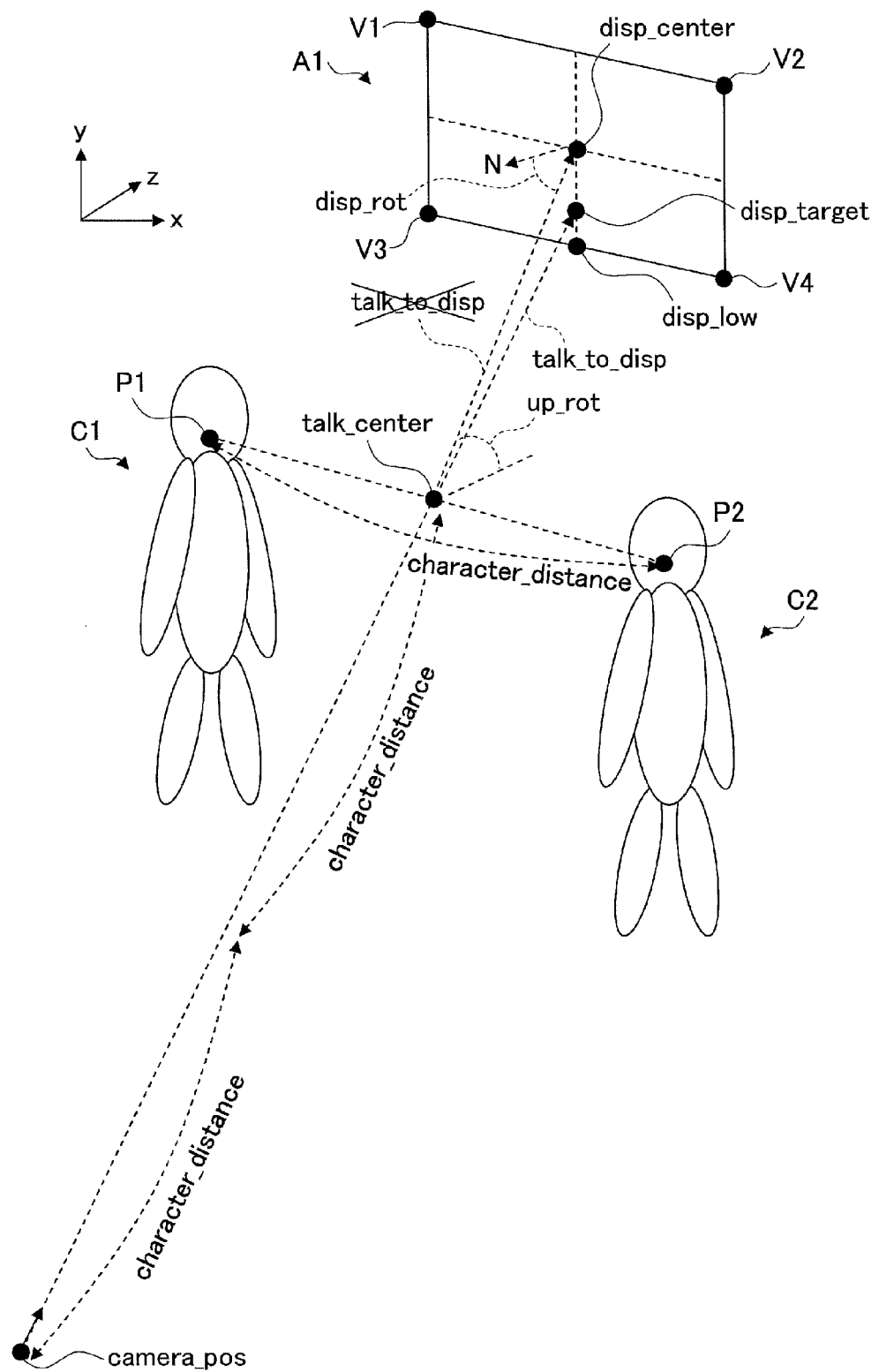
FIG. 11 is a view for explaining targets to be calculated by the setting of a camera.

Referring back to FIG. 8, the vector from the talk center point coordinate "talk_center" toward the AD target point coordinate "disp_target" is calculated to update the vector from the talk center point toward the AD center point "talk_to_disp" (step S213). FIG. 11 shows a new vector from the talk center point toward the AD center point "talk_to_disp" which is the vector from the talk center point coordinate "talk_center" toward the AD target point coordinate "disp_target" substituting the previous vector from the talk center point toward the AD center point "talk_to_disp".

Referring back to FIG. 8, whether the vector from the talk center point toward the AD center point "talk_to_disp" and the stage model for determining permeability of line of vision are crossing is determined (step S214). In other words, whether there is any object that intercepts the talk center point coordinate "talk_center" and the AD target point coordinate disp_target is determined.

When the vector from the talk center point toward the AD center point "talk_to_disp" and the stage model for determining permeability of line of vision are crossing (NO of step S214), as it is difficult for the player to see the AD, the number of the AD in the game "a" is incremented (step S223 in FIG. 9) and the process goes back to the comparison with the total number of AD in the game at the current stage (step S204).

When the vector from the talk center point toward the AD center point "talk_to_disp" and the stage model for determining permeability of line of vision are not crossing (YES of step S214), the distance between the face of the player character and the face of the enemy character is calculated to be set as the distance between characters "charactor_distance" (step S215). Referring to FIG. 11, the distance between characters "charactor_distance" which is the distance between the face reference coordinate P1 of the player character C1 and the face reference coordinate P2 of the enemy character C2 is shown.

Referring back to FIG. 8, the vector from the AD target point coordinate "disp_target" toward the talk center point coordinate "talk_center" is calculated to be set as the vector from the AD center point toward the talk center point "disp_to_talk" (step S216). The vector from the AD center point toward the talk center point "disp_to_talk" is equal to that obtained by reversing the direction of the vector from the talk center point toward the AD center point "talk_to_disp".

Subsequently, a coordinate obtained by adding a vector having a length adjusted to be twice the distance between characters "charactor_distance" while maintaining the direction of the vector from the AD center point toward the talk center point "disp_to_talk", to the talk center point coordinate "talk_center", is calculated to be set as the temporary camera coordinate "camera_pos" (step S217). Here, the length "twice" is just an example determined based on an experience, and may be altered to other values. Referring to FIG. 11, the temporary camera coordinate "camera_pos" which is set at a distance twice as long as the distance between characters "charactor_distance" from the talk center point coordinate "talk_center" at an opposite side of the AD "A1" in the direction of the vector from the AD center point toward the talk center point "disp_to_talk" (opposite direction of the vector from the talk center point toward the AD center point "talk_to_disp") is shown.

Subsequently, Referring to FIG. 9, a camera is generated by having the temporary camera coordinate "camera_pos" as a position of the camera and the AD target point coordinate "disp_target" as the point to which the camera views (a point exists in the visual direction) to set as the temporary camera "camera" (step S218).

Subsequently, a conversion of field of view and a perspective transformation are performed onto the four corners of the "a"th AD using the temporary camera "camera", and an area size is calculated based on the converted four points on the 2D-plane to be set as the AD size in screen (step S219).

Subsequently, whether the AD size in screen is more than or equal to a predetermined reference value (for example, 2% of the size of the screen) is determined (step S220).

When the AD size in screen is less than the predetermined reference value (NO of step S220), it is difficult for the player to see the AD as the size is too small, the number of the AD in the game "a" is incremented (step S223 in FIG. 9) and the process goes back to the comparison with the total number of AD in the game at the current stage (step S204).

When the AD size in screen is more than or equal to the predetermined reference value (YES of step S220), whether the AD size in screen is more than the current maximum AD size in screen "near_size" is determined (step S221).

When the AD size in screen is less than or equal to the current maximum AD size in screen "near_size" (NO of step S221), it is determined that there already exists a more advantageous AD than the current AD in size, and the number of the AD in the game "a" is incremented (step S223 in FIG. 9) and the process goes back to the comparison with the total number of AD in the game at the current stage (step S204).

When the AD size in screen is larger than the current maximum AD size in screen "near_size" (YES of step S221), the AD size in screen is set as the current maximum AD size in screen "near_size" and the temporary camera "camera" is set as the current camera setting "near_camera" (step S222).

Subsequently, the number of the AD in the game "a" is incremented (step S223 in FIG. 9) and the process goes back to the comparison with the total number of AD in the game at the current stage (step S204).

Figure 12:
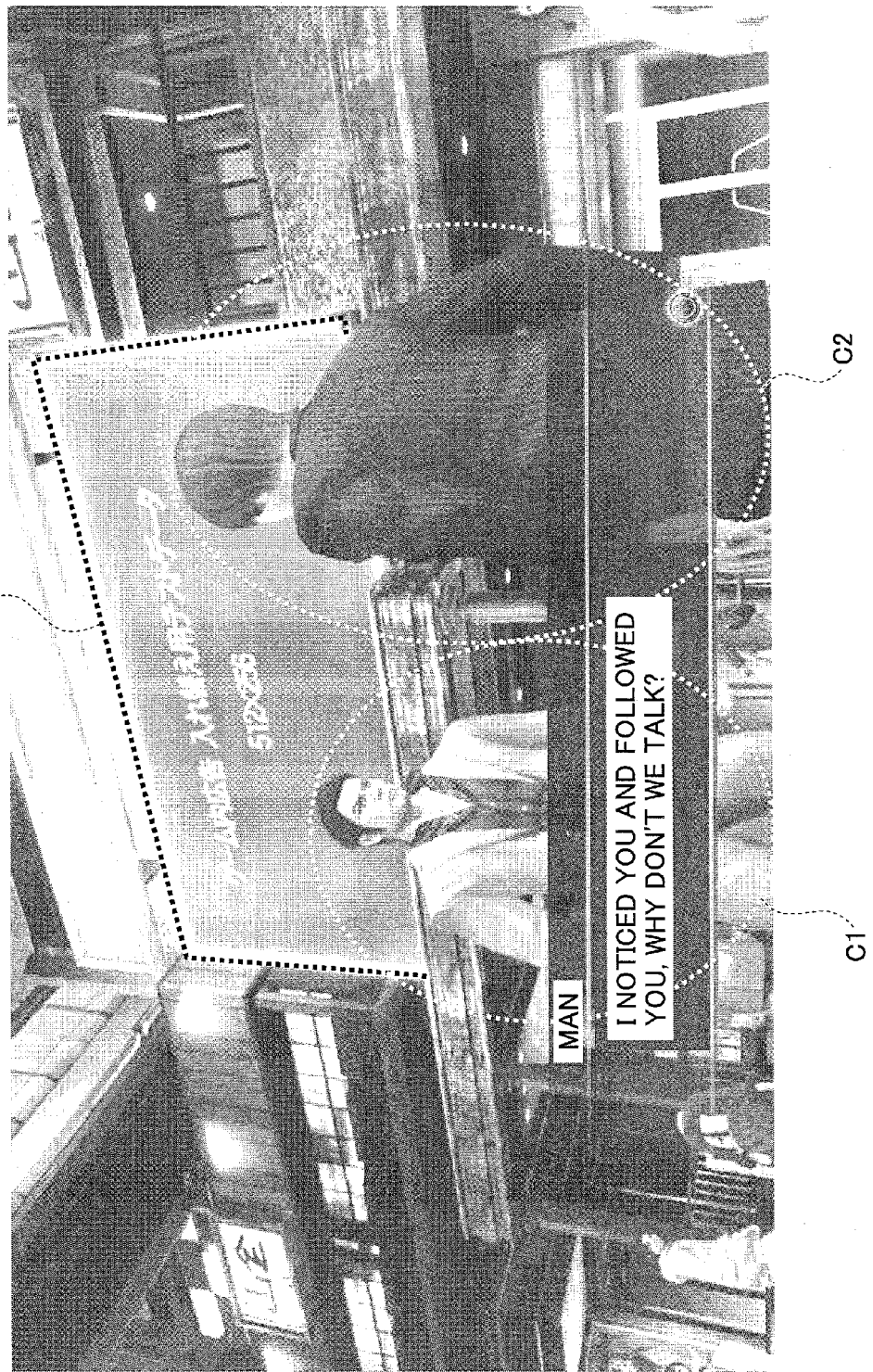
FIG. 12 is a view showing an example of a display screen obtained by a camera set by the setting of a camera.

FIG. 12 is a view showing an example of a display screen obtained by the camera set by the above operation, where an AD "A1" is naturally displayed with a large size and in a good angle at background of the scene of talk between the player character C1 and the enemy character C2. Further, after the camera is set by the above operation, by suspending the movement of the viewpoint and the viewed point, it is easier for the player to see the AD "A1". Here, the movement of the viewpoint and the viewed point may be suspended until the input operation by the player is performed for a predetermined number.

Figure 13:
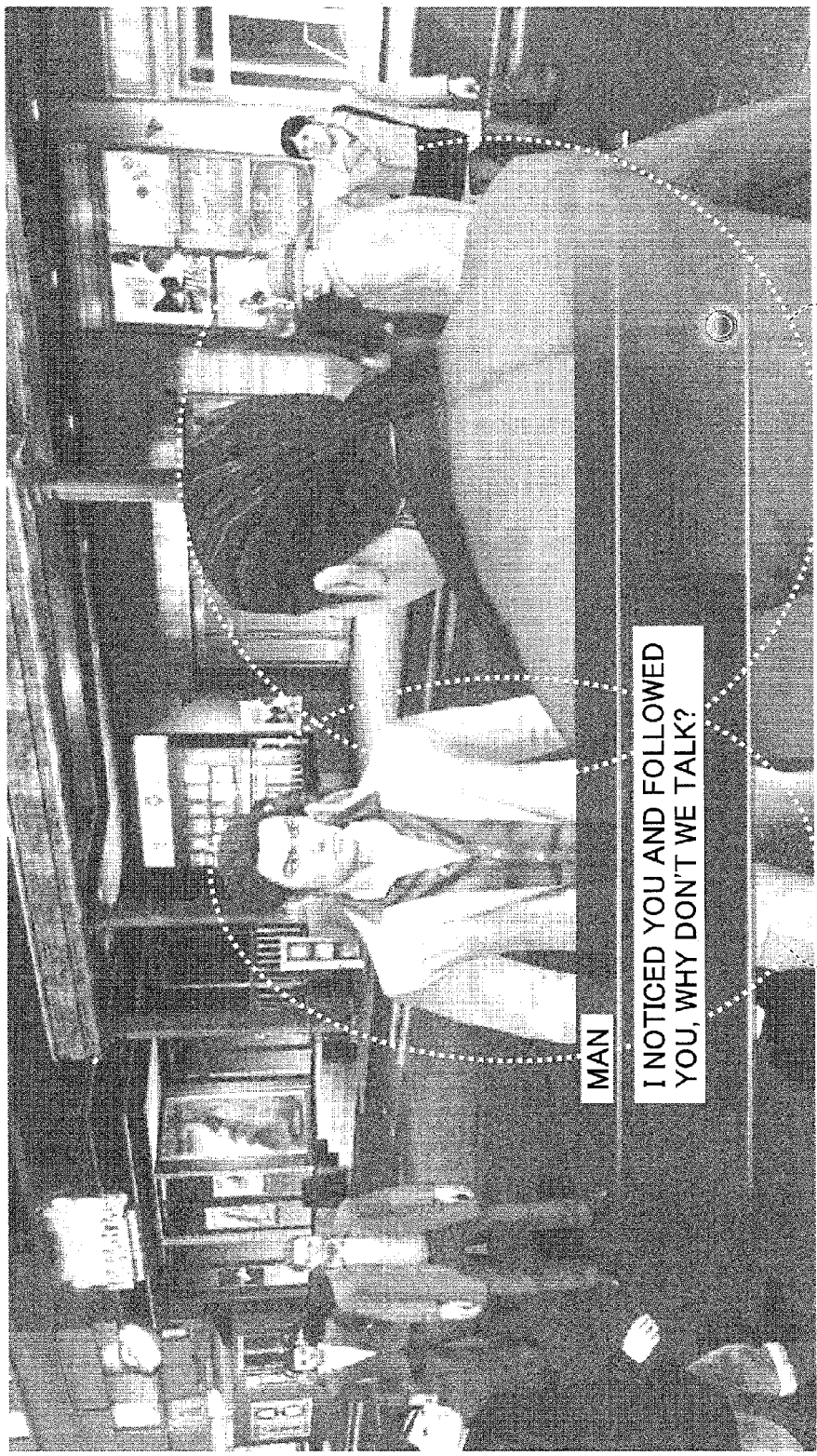
FIG. 13 is a view showing an example of a display screen when the setting of a camera is not performed.

FIG. 13 is a view showing an example of a display screen for a case when the setting of a camera as described above is not performed, for a comparison. The AD (A1) at background is not displayed as the display screen is obtained from the height of the eye lines of the player character C1 and the enemy character C2 based on the viewpoint of a normal conversation camera. Here, the viewed point position of the normal conversation camera is set to the talk center point coordinate "talk_center". Further, the viewpoint position of the normal conversation camera is set based on the proximate viewpoint just before the player character comes within the contacting distance of the enemy character.

For the example as described above, a view point and a viewed point that promotes the player to see an effective AD, are naturally provided as the setting of a camera in the conversation mode (the progression of which mainly depends on system side), which is started by an event that the player character (first object) is within the contacting distance of the enemy character (second object) while the player character is moving within a virtual space in the adventure mode. Therefore, for other games or the like in which the control of the camera moves to the system side by generation of a certain event, this technique is similarly adapted.

For example, the method of image processing of the embodiment may be adapted to a baseball game. While playing the baseball game, when the player character (first object), who is a fielder jumps to the ball (second object) to catch it and this is judged as a fine play by the control program, the scene of catching the ball is replayed (event). Here, while replaying, it is impossible to control the movement of the viewpoint and the viewed point by the input operation of the player.

At this time, the above described talk center point coordinate "talk_center" is, for example, an arbitral point on a track of a ball (for example, a middle point between the maximum height and a point of fall). The temporary camera coordinate "camera_pos", which is set on a half line from the AD target point coordinate "disp_target" toward the talk center point coordinate "talk_center", is, for example, a coordinate obtained by adding twice the distance between the face reference coordinate P1 of the player character and the reference coordinate P2 on the track of the ball to the distance from the AD target point coordinate "disp_target" toward the talk center point coordinate "talk_center". With this, the AD, the player character, and the track of the ball are included in the display screen.

For example, the method of image processing of the embodiment may be adapted to a football game. While playing the football game, when the player character (first object) performs a bad foul, and an event (by which the movement control of the viewpoint and the viewed point by the player is inhibited) by which a judge character (second object) raises a yellow card or the like is generated.

At this time, the above described talk center point coordinate "talk_center" is a center point between the face of the player character and the face of the judge character or a predetermined height at the place where the foul is performed, for example. The operation after this is the same as that explained above for the adventure mode.

Further, when the player character gets a goal by shooting or the like, replay (event) is performed. Similar to the above described baseball game, while replaying, it is impossible to control the movement of the viewpoint and the viewed point by the input operation of the player.

At this time, the above described talk center point coordinate "talk_center" is, for example, a middle point between the face reference coordinate P1 of the player character (first object) who has gotten a goal and the reference coordinate P2 of the goal (second object). Further, the temporary camera coordinate "camera_pos" which is set on a half line from the AD target point coordinate "disp_target" toward the talk center point coordinate "talk_center", is a coordinate obtained by adding twice the distance between the face reference coordinate P1 of the player character and the reference coordinate P2 of the goal P2 to the distance from the AD target point coordinate "disp_target" toward the talk center point coordinate "talk_center", for example. With this, images of the AD, the player character, and the goal are included in the display screen.

For example, the method of image processing of the embodiment may be adapted to a race game. While playing the race game, when a player car (first object) gets ahead of an opposing car (second object) which is at a first position or the like, replay (event) may be performed after the race.

At this time, the above described talk center point coordinate "talk_center" is set as a center point between the reference coordinate P1 of the player car and the reference coordinate P2 of the opposing car when getting ahead or a path set in the road. Then, the temporary camera coordinate "camera_pos", which is set on a half line from the AD target point coordinate "disp_target" toward the talk center point coordinate "talk_center", is a coordinate obtained by adding twice the distance between the reference coordinate P1 of the player car and the reference coordinate P2 of the opposing car to the distance from the AD target point coordinate "disp_target" toward the talk center point coordinate "talk_center", for example. With this, images of the AD, the player car, and the opposing car are included in the display screen.

As described above, according to the embodiment, an advertisement image is naturally and effectively displayed so that advertising rates can be increased.

The present invention is not limited to the specifically disclosed embodiments, and variations and modifications may be made without departing from the scope of the present invention.

The present application is based on Japanese Priority Application No. 2009-280915 filed on Dec. 10, 2009, the entire contents of which are hereby incorporated herein by reference.

What is claimed is:

1. A non-transitory computer-readable recording medium having recorded thereon an image processing program that causes a computer to function as units comprising:
   a placing unit that places at least a first object, a second object and a viewed object within a virtual space, as objects within the virtual space;
   a display unit that displays the objects in a screen by performing a coordinate conversion based on a viewpoint and a viewed point set within the virtual space;
   a moving unit that moves the first object within the virtual space based on an operation by a player;
   a moving control unit that controls movement of the viewpoint and the viewed point within the virtual space based on an operation by the player;
   an event generating unit that generates an event based on relationship between the second object and the first object which move within the virtual space;
   a center point determining unit that determines a center point of the event based on a coordinate of at least one of the first object and the second object when the event is generated; and a setting unit that sets a target point set on the viewed object as the viewed point, and sets the viewpoint on a half line starting from the viewed point to be passing the center point of the event.

2. The non-transitory computer-readable recording medium according to claim 1,
wherein after the setting unit sets the viewpoint and the viewed point, controlling of the movement of the viewpoint and the viewed point is suspended.

3. The non-transitory computer-readable recording medium according to claim 1,
wherein the placing unit sets the plural viewed objects within the virtual space,
the setting unit selects the viewed object which is shown on the screen at the largest size after removing the viewed object for which an angle calculated based on vector from the center point of the event toward the viewed object and normal vector of the viewed object is more than or equal to a predetermined angle, and the viewed object for which another object exists between a temporary viewpoint and the viewed object, and sets the target point of the selected viewed object as the viewed point.

4. The non-transitory computer-readable recording medium according to claim 1,
wherein an upward angle from the viewpoint to the viewed point with respect to a horizontal plane is calculated, and when the upward angle is more than or equal to a predetermined angle, the target point of the viewed object is set at a lower part of the viewed object.

5. The non-transitory computer-readable recording medium according to claim 1, wherein the coordinate of the viewpoint set on the half line is set based on the distance between the first object and the second object.

6. A method of image processing executed by a control unit of an image processing apparatus that includes at least an input unit, a display unit and the control unit, comprising:
placing at least a first object, a second object and a viewed object within a virtual space, as objects within the virtual space;
displaying the objects in a screen by performing a coordinate conversion based on a viewpoint and a viewed point set within the virtual space;
moving the first object within the virtual space based on an operation by a player;
controlling movement of the viewpoint and the viewed point within the virtual space based on an operation by the player;
generating an event based on relationship between the second object and the first object which move within the virtual space;
determining a center point of the event based on a coordinate of at least one of the first object and the second object when the event is generated; and
setting a target point set on the viewed object as the viewed point, and then setting the viewpoint on a half line starting from the viewed point to be passing the center point of the event.

* * * * *